(12) United States Patent
Gudapati et al.

(10) Patent No.: US 12,338,665 B2
(45) Date of Patent: Jun. 24, 2025

(54) HIGH VOLTAGE SYSTEM TO EXPEDITE PROPULSION READINESS FOR ELECTRIFIED POWERTRAIN VEHICLES

(71) Applicants: Abhilash Gudapati, Troy, MI (US); Daniele S Zaharia, Modena (IT)

(72) Inventors: Abhilash Gudapati, Troy, MI (US); Daniele S Zaharia, Modena (IT)

(73) Assignee: FCA US LLC, Auburn Hills, MI (US)

( * ) Notice: Subject to any disclaimer, the term of this patent is extended or adjusted under 35 U.S.C. 154(b) by 284 days.

(21) Appl. No.: 17/859,080

(22) Filed: Jul. 7, 2022

(65) Prior Publication Data

US 2024/0011336 A1 Jan. 11, 2024

(51) Int. Cl.
| | |
|---|---|
| *E05B 81/56* | (2014.01) |
| *B60L 1/00* | (2006.01) |
| *B60L 58/10* | (2019.01) |
| *E05B 81/04* | (2014.01) |

(52) U.S. Cl.
CPC .............. *E05B 81/56* (2013.01); *B60L 1/003* (2013.01); *B60L 58/10* (2019.02); *E05B 81/04* (2013.01)

(58) Field of Classification Search
CPC .......... E05B 81/56; E05B 81/04; B60L 1/003; B60L 58/10; B60L 2240/54; B60L 2250/12; B60L 1/00; B60L 2240/28; B60L 2260/22; B60L 3/12
See application file for complete search history.

(56) References Cited

U.S. PATENT DOCUMENTS

| | | | |
|---|---|---|---|
| 7,832,513 B2 | 11/2010 | Verbrugge et al. | |
| 9,346,360 B2 | 5/2016 | Buchzik et al. | |
| 10,543,757 B2 | 1/2020 | Diab et al. | |
| 2014/0053618 A1* | 2/2014 | Yamaguchi | E05B 83/36 70/91 |
| 2018/0066457 A1* | 3/2018 | Erices | E05B 81/14 |
| 2018/0080263 A1* | 3/2018 | Rose | B60R 25/25 |

(Continued)

FOREIGN PATENT DOCUMENTS

| | | | |
|---|---|---|---|
| CN | 109249811 A | | 1/2019 |
| CN | 110901585 A | * | 3/2020 |

(Continued)

OTHER PUBLICATIONS

Machine translation for CN110901585A, Mar. 24, 2020, China, Li Hu.*

(Continued)

*Primary Examiner* — Abdalla A Khaled
(74) *Attorney, Agent, or Firm* — Jeremy J. Klobucar

(57) ABSTRACT

An electrified vehicle includes a vehicle door, an electronic door latch system configured to selectively open the vehicle door, and an electrified powertrain configured to generate drive torque. A high voltage battery system for powering the electrified powertrain includes one or more battery contactors to selectively enable the high voltage battery system. A controller is configured to control operation of the vehicle and is in communication with the electronic door latch system. Upon receiving a door open request from the electronic door latch system, the controller activates the one or more battery contactors to enable the high voltage battery system only when the door open request is initiated from an outside of the vehicle.

14 Claims, 5 Drawing Sheets

(56) References Cited

U.S. PATENT DOCUMENTS

| | | | |
|---|---|---|---|
| 2018/0201187 A1* | 7/2018 | Yellambalase | B60L 50/51 |
| 2018/0283080 A1* | 10/2018 | Tamura | B60R 25/24 |
| 2019/0184921 A1* | 6/2019 | Kageyama | H02J 7/0063 |
| 2019/0322178 A1* | 10/2019 | Sturza | B60L 3/0069 |
| 2020/0095799 A1* | 3/2020 | Gerardiere | E05B 5/003 |
| 2020/0248490 A1* | 8/2020 | Scheuer | E05B 81/90 |
| 2020/0310406 A1* | 10/2020 | Lavoie | G05D 1/0016 |
| 2020/0377055 A1* | 12/2020 | Ando | B60W 50/0098 |
| 2021/0146911 A1* | 5/2021 | Yan | B60R 25/00 |
| 2022/0009365 A1* | 1/2022 | Ando | B60R 25/01 |
| 2022/0205309 A1* | 6/2022 | Castonguay | E05B 83/12 |
| 2022/0363269 A1* | 11/2022 | Saito | B60R 21/00 |
| 2023/0068522 A1* | 3/2023 | Tokudome | E05B 81/06 |

FOREIGN PATENT DOCUMENTS

| | | | |
|---|---|---|---|
| EP | 2058197 A1 | 5/2009 | |
| JP | 2008042985 A | 2/2008 | |

OTHER PUBLICATIONS

International Search Report and Written Opinion dated Oct. 25, 2023 for International Application No. PCT/US2023/069350, International Filing Date Jun. 29, 2023.

\* cited by examiner

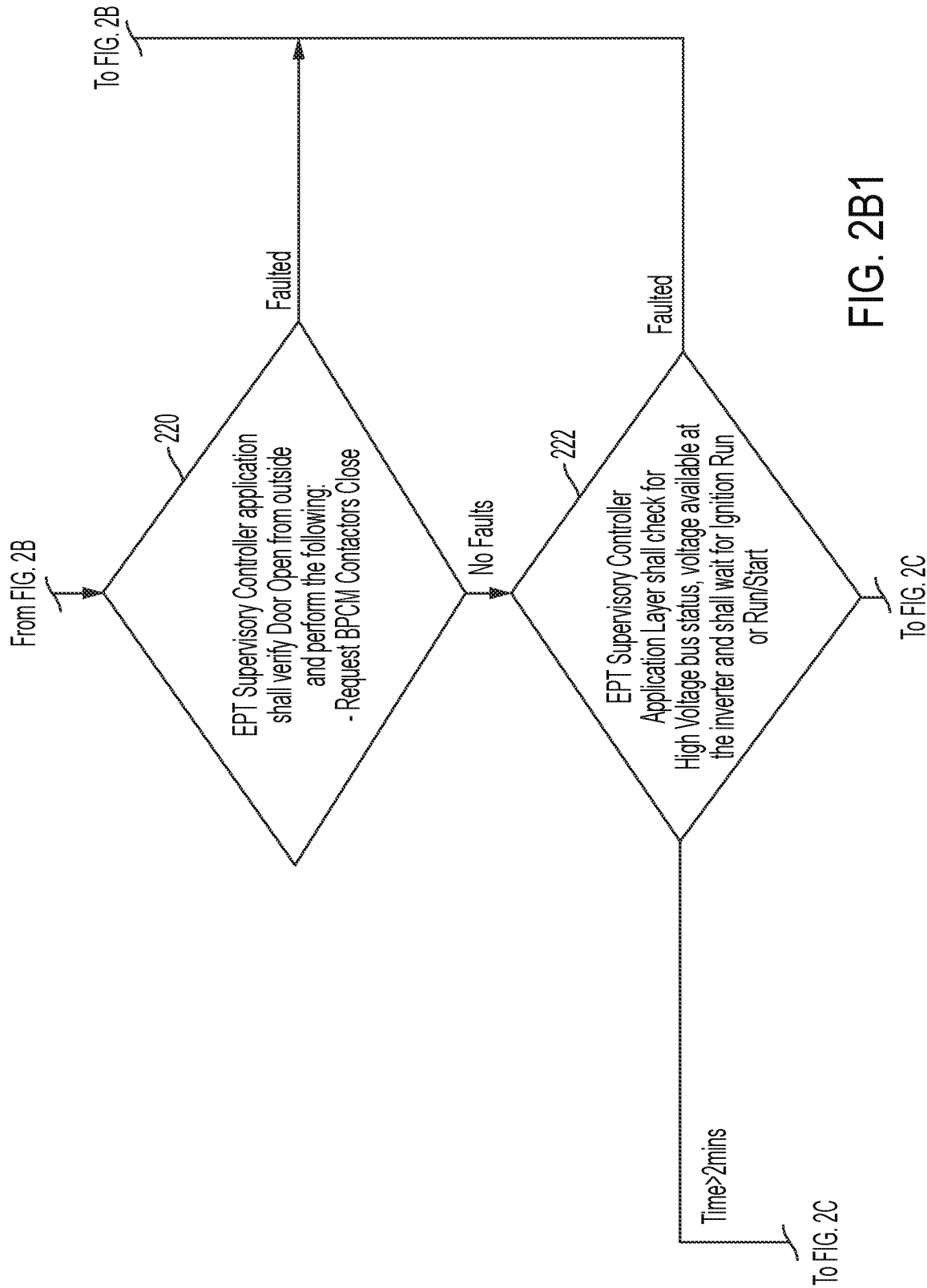
FIG. 2B1

HIGH VOLTAGE SYSTEM TO EXPEDITE PROPULSION READINESS FOR ELECTRIFIED POWERTRAIN VEHICLES

FIELD

The present application relates generally to high voltage electrified powertrain vehicles and, more particularly, to systems and methods to prevent a door ajar causing unintentional wakeup and high voltage enablement during shutdown activities.

BACKGROUND

In some electric vehicles, after a vehicle key off event, a supervisory controller proceeds to a pre-power down and shutdown state after a predetermined period of time. However, if a passenger remains in the vehicle beyond the predetermined period of time and opens a vehicle door to exit, the supervisory controller may perform an unintentional wakeup sequence and high voltage enablement believing the passenger is entering the vehicle rather than exiting. This can potentially result in reduced high voltage battery contactor life and reduced high voltage state of charge due to unnecessary high voltage enablement. Conventional solutions to this problem include the addition of excess hardware, such as weight sensors embedded into the driver seat or smart key/smartphone/facial recognition authentication, but this could significantly increase costs and complexity, as well as delay high voltage enablement. Thus, while conventional systems do work well for their intended purpose, there remains a need for improvement in the relevant art.

SUMMARY

In accordance with one example aspect of the invention, an electrified vehicle is provided. In one example implementation, the electrified vehicle includes a vehicle door, an electronic door latch system configured to selectively open the vehicle door, and an electrified powertrain configured to generate drive torque. A high voltage battery system for powering the electrified powertrain includes one or more battery contactors to selectively enable the high voltage battery system. A controller is configured to control operation of the vehicle and is in communication with the electronic door latch system. Upon receiving a door open request from the electronic door latch system, the controller activates the one or more battery contactors to enable the high voltage battery system only when the door open request is initiated from an outside of the vehicle.

In addition to the foregoing, the described vehicle may include one or more of the following features: wherein the controller is programmed to not activate the one or more battery contactors to enable the high voltage battery system when the door open request is initiated from an inside of the vehicle; wherein the vehicle further includes an external latch release switch disposed on an exterior of the vehicle and configured to generate an external door open request, wherein the controller is configured to receive the external door open request; and wherein the vehicle further includes an internal latch release switch disposed in an interior of the vehicle, the internal latch release switch configured to generate an internal door open request, wherein the controller is configured to receive the internal door open request.

In addition to the foregoing, the described vehicle may include one or more of the following features: wherein the controller is configured to activate the one or more high voltage battery contactors during power-up or power-down activities; wherein the controller is an electrical vehicle control unit (EVCU) configured to control operation of the electric vehicle; wherein the electronic door latch system includes a latch smart driver module (LSDM) in signal communication with the EVCU, a motor driven latch in signal communication with the LSDM, an external release switch in signal communication with the LSDM and configured to generate an external door open request signal, and an internal release switch in signal communication with the LSDM and configured to generate an internal door open request signal; and a body controller module (BCM) in signal communication with the LSDM and the EVCU, wherein the BCM is configured to receive the internal and external door open request signals and, based on said request signals, determine whether the vehicle door is opened from the exterior of the vehicle or the interior of the vehicle.

In accordance with another example aspect of the invention, a method of operating an electric vehicle to prevent unintentional controller wakeup and high voltage system enablement as a result of opening a door of the vehicle is provided. The vehicle includes an electronic door latch system and a high voltage battery system for powering an electrified powertrain. In one example implementation, the method includes providing a controller in signal communication with the electronic door latch system and configured to control operation of the vehicle, receiving, by the controller, a door open request signal from the electronic door latch system indicating the vehicle door has been opened, and determining, based on the door open request signal, if the vehicle door was opened from an exterior of the vehicle or an interior of the vehicle. The method further includes activating, by the controller, one or more battery contactors of the high voltage battery system to enable the high voltage battery system only when the door open request signal indicates the vehicle door was opened from the exterior of the vehicle.

In addition to the foregoing, the described method may include one or more of the following features: preventing, via the controller, activation of the one or more battery contactors to prevent enablement of the high voltage battery system when the door open request is initiated from an inside of the vehicle; wherein the controller is configured to receive an external door open request from an external latch release switch disposed on an exterior of the vehicle; wherein the controller is configured to receive an internal door open request from an internal latch release switch disposed in an interior of the vehicle; and activating, by the controller, the one or more high voltage battery contactors during power-up or power-down activities.

In addition to the foregoing, the described method may include one or more of the following features: wherein the controller is an electrical vehicle control unit (EVCU) configured to control operation of the electric vehicle; wherein the electronic door latch system includes a latch smart driver module (LSDM) in signal communication with the EVCU, a motor driven latch in signal communication with the LSDM, an external release switch in signal communication with the LSDM and configured to generate an external door open request signal, and an internal release switch in signal communication with the LSDM and configured to generate an internal door open request signal; receiving, at a body controller module (BCM), the internal and external door open request signals, and differentiating between the internal door open request signal and the external door request signal to determine if the vehicle door is opened from the exterior of the vehicle or the interior of the vehicle.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

According to the principles of the present application, systems and methods are provided for distinguishing between a user opening the vehicle door from the inside or the outside to prevent an unintentional wakeup sequence and high voltage enablement when the user opens the vehicle door from the inside. This prevents a supervisory controller from restarting a process for high voltage enablement when the door is opened from the inside. To accomplish this, the system utilizes separate signals indicating an external or an internal vehicle door opening. The high voltage system is only enabled when the user opens the door from the outside at any point during power-up or power-down activities to ensure an unintentional wakeup does not occur. This prevents unintended high voltage (HV) battery contactor closure and high voltage system enablement, thereby improving battery contactor life and promoting efficient use of state of charge of the high voltage system.

Figure 1:
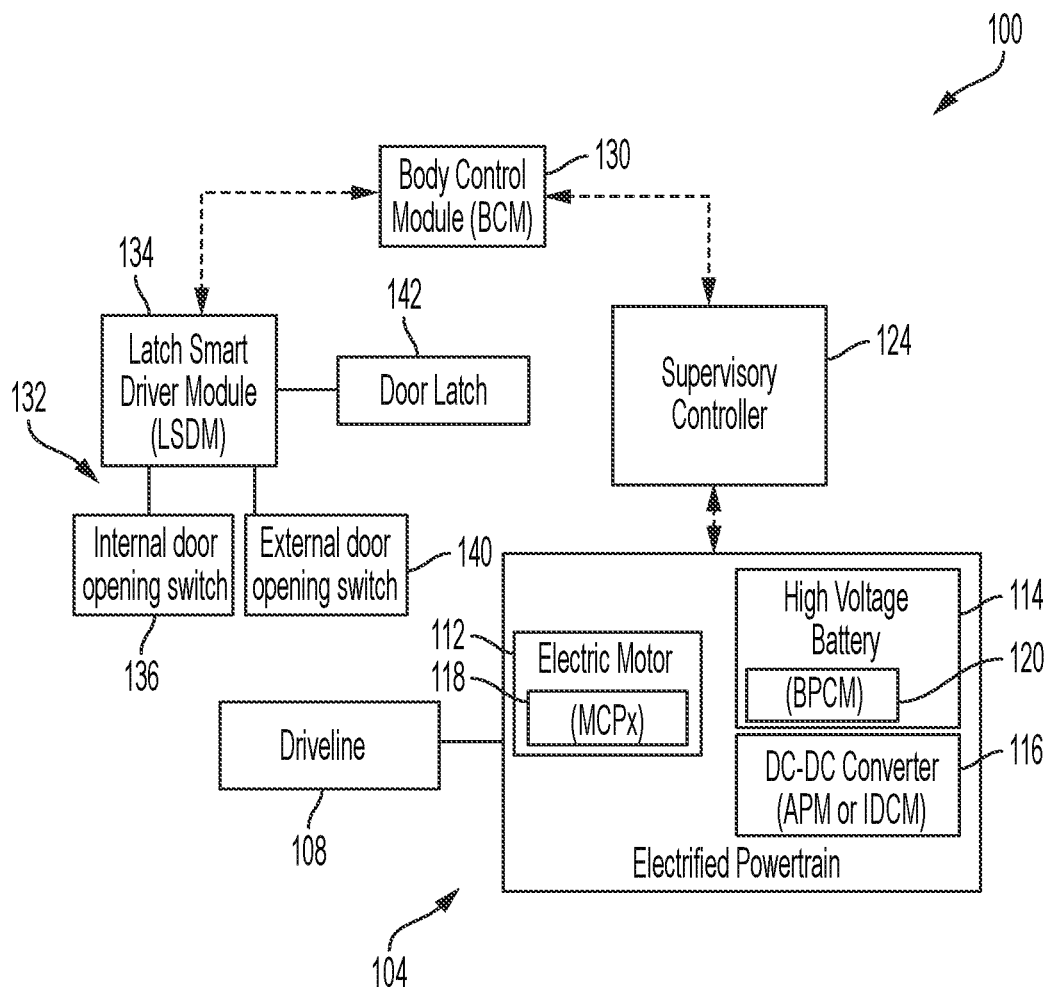
FIG. 1 is a functional block diagram of an electrified vehicle having an unintentional wakeup and high voltage enablement prevention system, in accordance with the principles of the present disclosure.

With reference now to FIG. 1, a functional block diagram of an electric vehicle (EV) 100 having an unintentional wakeup and HV enablement prevention system 102 according to the principles of the present application is illustrated. The EV 100 generally includes an electrified powertrain (EPT) 104 configured to generate (via an electric drive module, or EDM 106) drive torque to a driveline 108 for propulsion. It will be appreciated that the electrified powertrain 104 could have other suitable configurations. The electrified powertrain generally comprises one or more electric motors 112, a high voltage battery system 114 for powering the electric motor(s) 112, and a DC-DC converter 116.

In some examples, the electric motor(s) 112 include one or more motor controller processor (MCPx) 118. The high voltage battery system 114 may include a battery pack control module (BPCM) 120 configured to close one or more battery contactors (not shown) to selectively enable high voltage on the EPT 104. The DC-DC converter 116 may be an integrated dual charging module (IDCM), auxiliary power module (APM), etc. While the DC-DC converter 116 is generally shown as part of the electrified powertrain (EPT) 104, it will be appreciated that the DC-DC converter 116 could be located separately from the electrified powertrain 104.

In the example embodiment, an electrified powertrain supervisory controller 124 is in communication with the EPT 104 and other components via a controller area network (CAN) and is configured to control operation of the vehicle, including the high voltage system of EV 100. The supervisory controller 124 may be various types of one or more controllers depending on vehicle type. For example, supervisory controller 124 may be a hybrid control processor (HCP), an electric vehicle control unit (EVCU), a vehicle dynamics control module (VDCM), or the like. In the example embodiment, the EPT controller will be referred to as EVCU 124. One primary control aspect of the EVCU 124 is to control the electrified powertrain 104 to generate a desired amount of drive torque to meet a driver demand (e.g., input via an accelerator pedal). The EVCU 124 and other controllers are typically powered by a low voltage battery (not shown), which could also be utilized to power one or more accessory loads (not shown) of the EV 100. A body controller module (BCM) 130 is in signal communication with the EVCU 124 and is configured to gate data information to the EVCU 124 from an electronic latch door system 132. A majority of these components are also generally referred to as "an electrical system" of the EV 100.

As shown in FIG. 1, in the example implementation, the electronic latch door system 132 generally includes a controller or latch smart drive module (LSDM) 134 in signal communication with an internal door release button or switch 136, an external door release button or switch 140, and a door latch 142. In one example, the LSDM 134 can include a motor or motor driver (not shown) configured to release the door latch 142. In this way, the LSDM 134 is configured to sense the door opening request from the user, and mechanically release the door latch 142 if the user pushes or actuates one of the switches 136, 140. The internal door release switch 136 is located in an interior of the EV 100, and the external door release switch 140 is located on an exterior of the EV 100. As such, the LSDM 134 sends signals indicative of actuation of the internal or external door release switches 136, 140 to the BCM 130 and EVCU 124. The signal(s) are subsequently evaluated to determine and confirm whether the door opening request is from the outside or the inside of the EV 100.

As discussed above, some conventional vehicles begin a controller wakeup and high voltage enablement when the driver door is opened. However, the driver exiting the vehicle can cause this wakeup, thus enabling the high voltage system when not desired. Accordingly, improved systems and method are presented herein and EV 100 includes unintentional wakeup and HV enablement prevention system 102 to prevent the wakeup and HV enablement when the vehicle door (e.g., driver door) is opened from inside the vehicle. In the example embodiment, the unintentional wakeup and HV enablement prevention system 102 generally includes the LSDM 134, the BCM 130, and the EVCU 124. As shown, the EVCU 124 is in signal communication with BPCM 120 to selectively close one or more battery contactors to enable high voltage on the electrified powertrain 104. Advantageously, the system 102 utilizes EVCU 124 to command the BPCM 120 to close the battery contactors and establish the high voltage circuit only if the door opening request is from the external door release button 148. In this way, the system is configured to prevent unintentional wakeup and high voltage activation that may reduce component life.

Figure 2A:
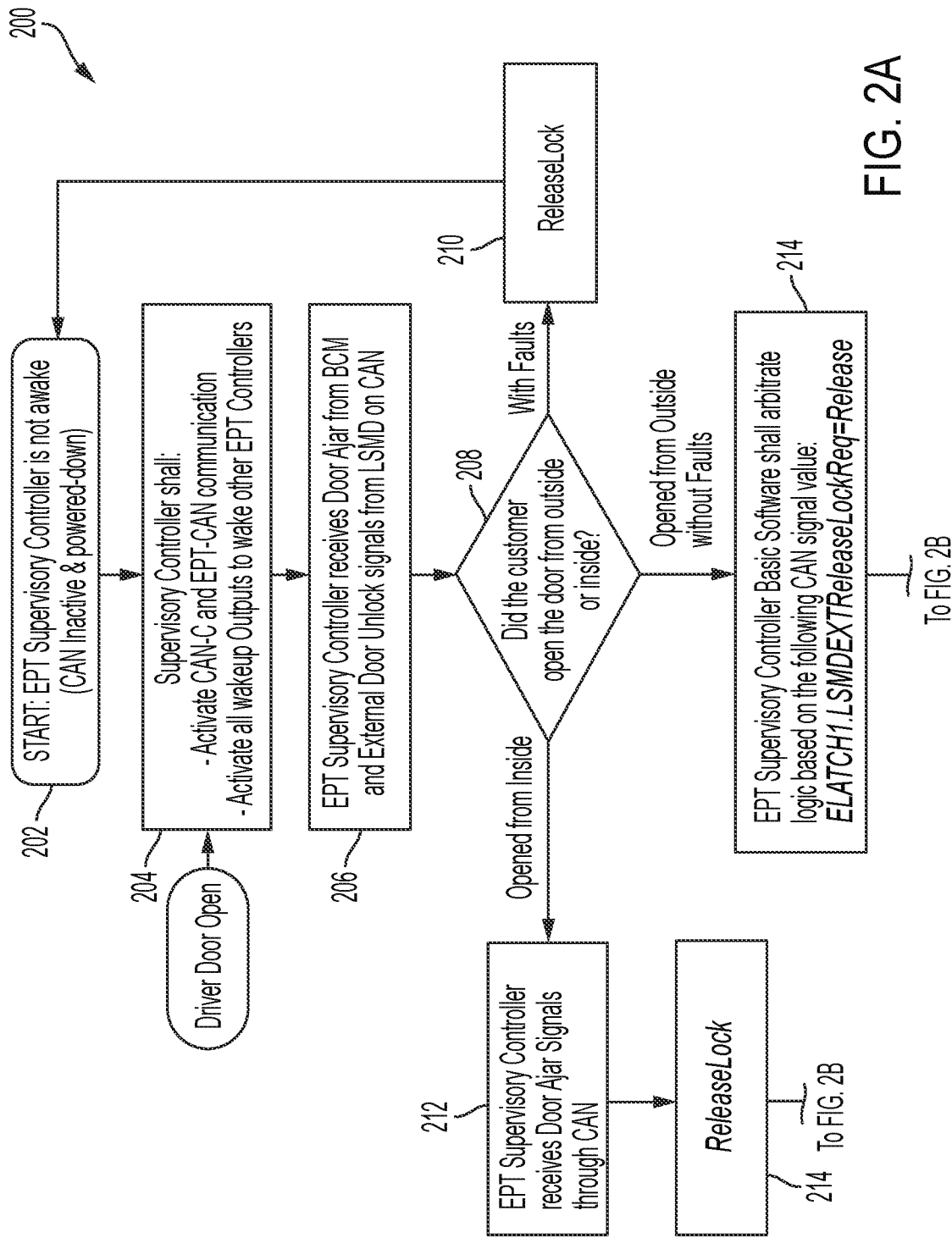
FIGS. 2A-2C illustrate a flow diagram of an example method of operating the electrified vehicle of FIG. 1 in accordance with the principles of the present disclosure.
Figure 2B:
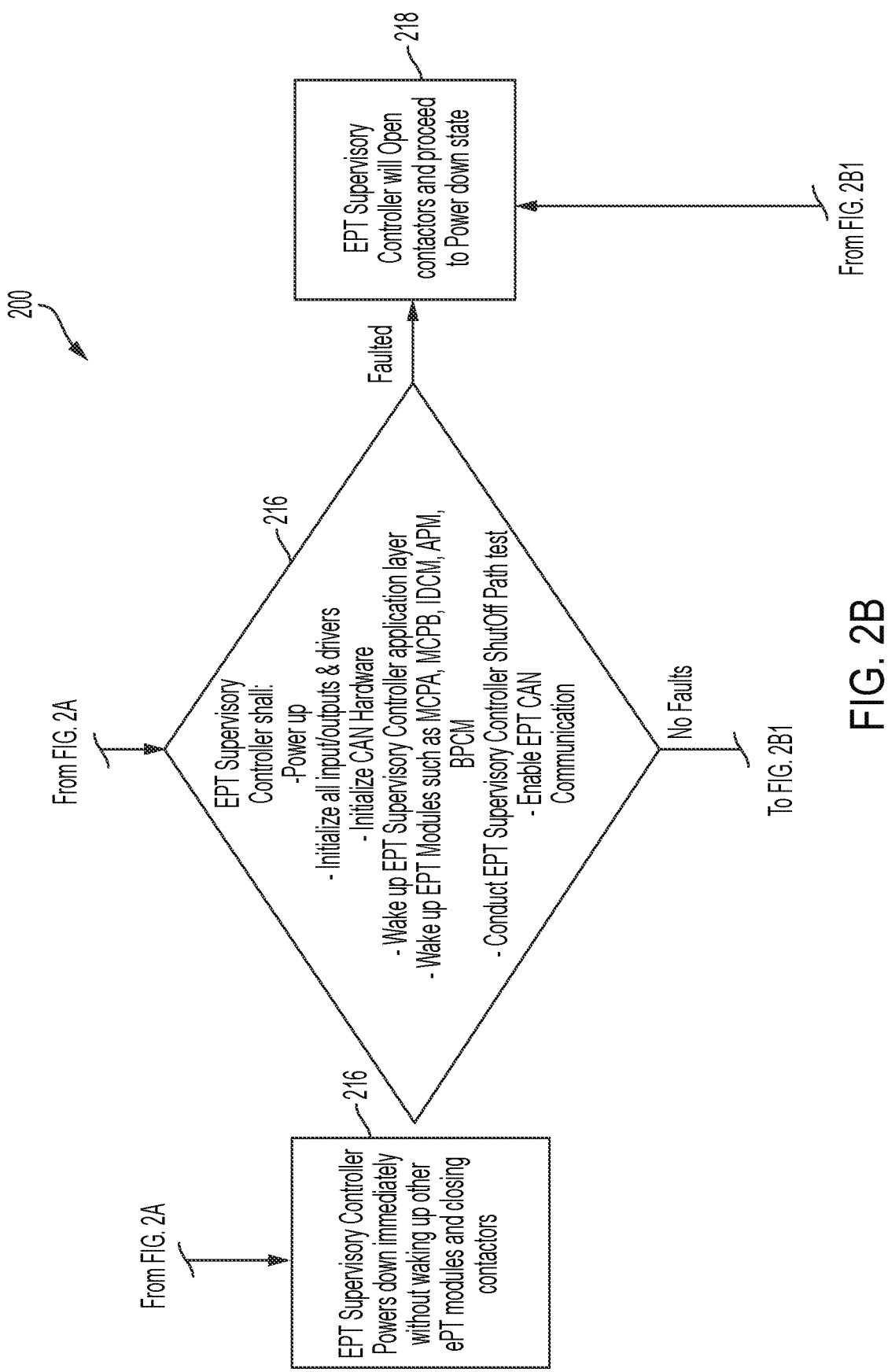
Figure 2C:
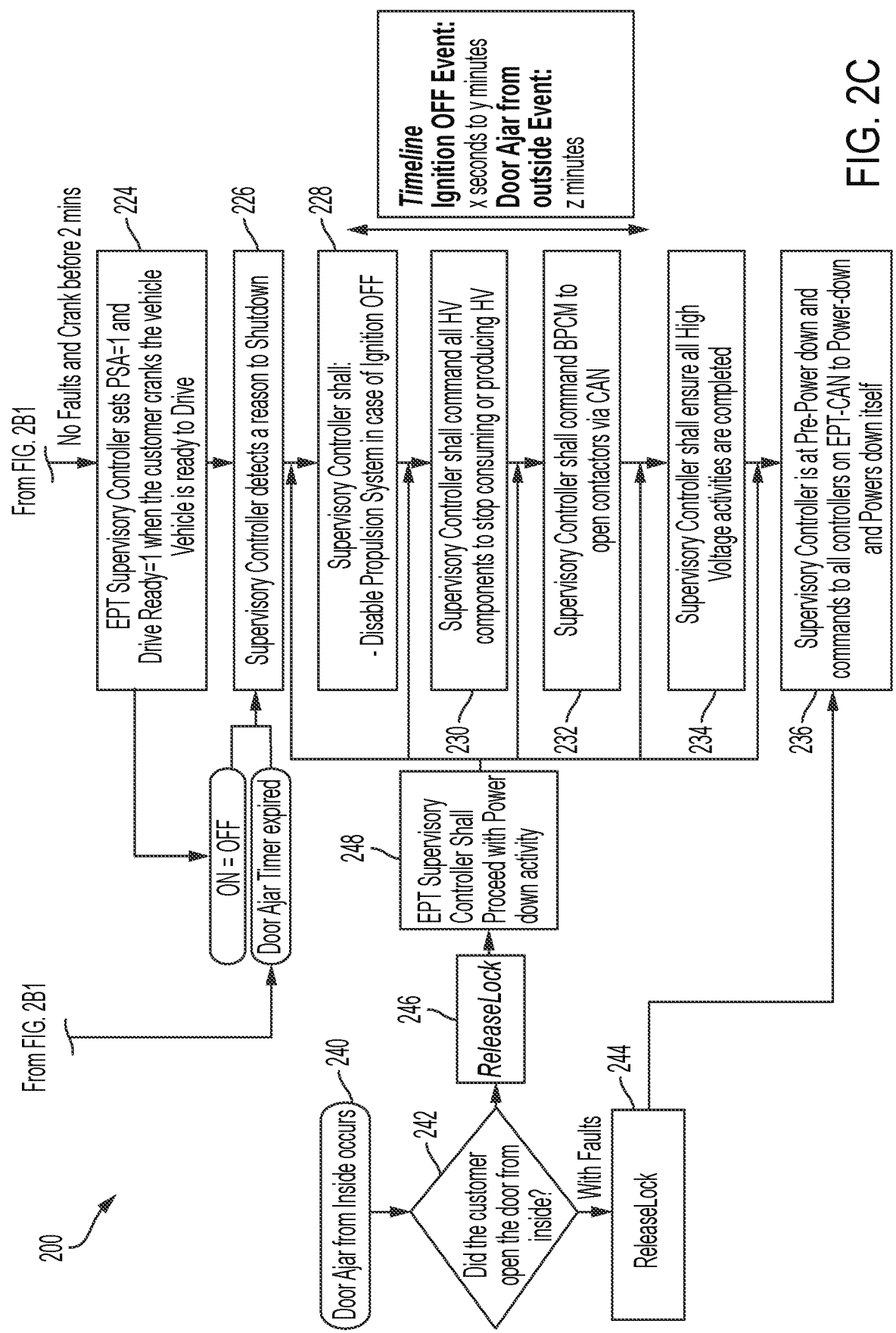

Referring now to FIGS. 2A-2C, an example method 200 of operating EV 100 to prevent unintentional controller wakeup and HV system enablement when the driver door is opened is illustrated. In the example embodiment, the method begins at step 202 where EVCU 124 is not awake, CAN is inactive and powered down. At step 204, once the driver door is opened, EVCU 124 activates CAN-C and EPT-CAN communication, and activates all wakeup outputs to wake other EPT controllers (e.g., MCPx 118, IDCM, APM, and BPCM 120). At step 206, the EVCU 124 receives door ajar signal together with an external/internal door opening request from LSDM 130 on the CAN. At step 208, EVCU 124 determines if the driver door was opened from the outside or the inside.

If any faults are detected, the LSDM 134 is commanded to open the door latch 142 at step 210, and control subsequently returns to step 202. If the driver door was opened from the inside, control proceeds to step 212. This may occur, for example, if the user is still inside the vehicle after key-off and the EVCU 124 goes to sleep, then the user opens the door from the inside. If the driver door was opened from the outside without faults, control proceeds to step 214.

At step 212, EVCU 124 receives the door ajar signal(s) through the CAN. At step 214, EVCU 124 evaluates or arbitrates logic based on the CAN signal value and commands the electronic door latch 142 to open. At step 216 (FIG. 2B), because the door was opened from the inside, EVCU 124 powers down without waking up other EPT modules or closing the battery contactors.

Returning to step 214 (FIG. 2A), when the door is opened from the outside without faults, EVCU 124 arbitrates logic based on the CAN signal value. At step 216 (FIG. 2B), EVCU 124 powers up, initializes all input/outputs and drivers, initializes CAN hardware, wakes up an EVCU application layer, wakes up EPT modules, conducts an EPT supervisory controller shutoff path test, and enables EPT CAN communication. EPT modules can include, for example, motor controller processor(s) MCPx 118, IDCM, APM, and BPCM 120. If faults are detected, control proceeds to step 218 and EVCU 124 opens the battery contactors and proceeds to a power down state.

If faults do not occur, control proceeds to step 220, and EVCU 124 verifies the driver door is opened from the outside and requests that BPCM 120 close the battery contactors. If faults are detected, control proceeds to step 218. If faults do not occur, control proceeds to step 222 and EVCU 124 application layer checks for HV bus status, voltage available at the inverter, and waits for an ignition run or run/start. If faults occur, control proceeds to step 218. If a predetermined amount of time (e.g., 2 mins) has passed since the driver door was opened indicating an expired door ajar timer, then at step 226 (FIG. 2C), EVCU 124 detects a reason to shut down. If no faults occur and the vehicle is cranked before expiration of the predetermined amount of time, EVCU 124 sets the EV 100 in a ready to drive state at step 224 (FIG. 2C), and proceeds to step 226. If vehicle ignition is turned off during step 224, control similarly proceeds to step 224.

Referring now to FIG. 2C, the method 200 continues at step 228, and EVCU 124 disables EPT 104 if the ignition off occurs. At step 230, EVCU 124 commands all HV components to stop consuming or producing high voltage. At step 232, EVCU 124 commands BPCM 120 to open the battery contactors via the CAN. At step 234, EVCU 124 ensures all high voltage activities are completed. At step 236, EVCU 124 is in a pre-power down state and commands all controllers on the EPT CAN to power down before the EVCU 124 powers itself down.

With continued reference to FIG. 2C, beginning at step 240, an operation is described where the driver door is opened from inside the vehicle while the EVCU 124 and associated components are attempting to power down due to the end of its reasonable function. For example, the user opens the door from the inside after key-off and before the EVCU 124 goes to sleep. In this case, the EVCU 124 continues to go to sleep and avoids unnecessary powerup. More specifically, at step 242, EVCU 124 determines if the door was opened from the inside of the vehicle. If faults are detected, LSDM 134 opens the door latch 142 at step 244 and proceeds to step 236. If no faults are detected, at step 246, EVCU 124 arbitrates logic based on the CAN signal value and commands the electronic latch 142 to open. At step 248, EVCU 124 proceeds with power shut down activities including subsequently performing one or more of steps 228-234. Control then proceeds to step 236 and EVCU 124 commands all controllers on the EPT-CAN to power down before powering itself down.

Described herein are systems and methods for preventing unintentional powerup of electric powertrain controllers/components when a vehicle door is opened from the inside of the vehicle. The system includes a supervisory controller that receives input signals from an electronic door latch. The controller distinguishes between door open requests originating from inside or outside of the vehicle. The controller closes high voltage battery contactors to enable the high voltage system only when the user opens the door from outside of the vehicle. This advantageously increases system life by avoiding unintended high voltage battery contactor closure and thus enablement of the high voltage system when the vehicle door is opened from the inside.

It will be appreciated that the term "controller" or "module" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An electrified vehicle comprising:
a vehicle door;
an electronic door latch system configured to selectively open the vehicle door;

an electrified powertrain configured to generate drive torque;

a high voltage battery system for powering the electrified powertrain and including one or more battery contactors to selectively enable the high voltage battery system; and a controller configured to control operation of the vehicle and in communication with the electronic door latch system, wherein upon receiving a door open request from the electronic door latch system, the controller activates the one or more battery contactors to enable the high voltage battery system only when the door open request is initiated from an outside of the vehicle, and wherein the controller is configured to prevent activation of the one or more battery contactors when the door open request is initiated from an inside of the vehicle.

2. The vehicle of claim 1, wherein the vehicle further includes an external latch release switch disposed on an exterior of the vehicle and configured to generate an external door open request, wherein the controller is configured to receive the external door open request.

3. The vehicle of claim 2, wherein the vehicle further includes an internal latch release switch disposed in an interior of the vehicle, the internal latch release switch configured to generate an internal door open request, wherein the controller is configured to receive the internal door open request.

4. The vehicle of claim 1, wherein the controller is configured to activate the one or more high voltage battery contactors during power-up or power-down activities.

5. The vehicle of claim 1, wherein the controller is a supervisory controller configured to control operation of the electric vehicle.

6. The vehicle of claim 5, wherein the electronic door latch system comprises:

a latch smart driver module (LSDM) in signal communication with the supervisory controller;

a motor driven latch in signal communication with the LSDM;

an external release switch in signal communication with the LSDM and configured to generate an external door open request signal; and an internal release switch in signal communication with the LSDM and configured to generate an internal door open request signal.

7. The vehicle of claim 6, further comprising a body controller module (BCM) in signal communication with the LSDM and the supervisory controller, wherein the BCM is configured to gate information between the LSDM and the supervisory controller, wherein the supervisory controller is configured to receive the internal and/or external door open request signals and, based on said request signals, determine whether the vehicle door is opened from the exterior of the vehicle or the interior of the vehicle.

8. A method of operating an electric vehicle to prevent unintentional controller wakeup and high voltage system enablement as a result of opening a door of the vehicle, the vehicle having an electronic door latch system and a high voltage battery system for powering an electrified powertrain, the method comprising:

providing a controller in signal communication with the electronic door latch system and configured to control operation of the vehicle;

receiving, by the controller, a door open request signal from the electronic door latch system indicating the vehicle door has been opened;

determining, based on the door open request signal, if the vehicle door was opened from an exterior of the vehicle or an interior of the vehicle;

activating, by the controller, one or more battery contactors of the high voltage battery system to enable the high voltage battery system only when the door open request signal indicates the vehicle door was opened from the exterior of the vehicle; and preventing, via the controller, activation of the one or more battery contactors to prevent enablement of the high voltage battery system when the door open request is initiated from an inside of the vehicle.

9. The method of claim 8, wherein the controller is configured to receive an external door open request from an external latch release switch disposed on an exterior of the vehicle.

10. The method of claim 9, wherein the controller is configured to receive an internal door open request from an internal latch release switch disposed in an interior of the vehicle.

11. The method of claim 8, further comprising activating, by the controller, the one or more high voltage battery contactors during power-up or power-down activities.

12. The method of claim 8, wherein the controller is a supervisory controller configured to control operation of the electric vehicle.

13. The method of claim 12, wherein the electronic door latch system comprises:

a latch smart driver module (LSDM) in signal communication with the supervisory controller;

a motor driven latch in signal communication with the LSDM;

an external release switch in signal communication with the LSDM and configured to generate an external door open request signal; and an internal release switch in signal communication with the LSDM and configured to generate an internal door open request signal.

14. The method of claim 13, further comprising:

receiving, at the supervisory controller, the internal and/or external door open request signals via a body controller module (BCM); and differentiating between the internal door open request signal and the external door request signal to determine if the vehicle door is opened from the exterior of the vehicle or the interior of the vehicle.

* * * * *